Aug. 21, 1951          C. V. EDWARDS          2,565,422
SALT FEEDING ATTACHMENT FOR HAY BALERS
Filed July 2, 1946          2 Sheets-Sheet 1

INVENTOR.
CURTIS V. EDWARDS
BY
ATTORNEY

Aug. 21, 1951  C. V. EDWARDS  2,565,422
SALT FEEDING ATTACHMENT FOR HAY BALERS
Filed July 2, 1946  2 Sheets-Sheet 2

INVENTOR.
CURTIS V. EDWARDS
BY *Jesse P. Whann*
ATTORNEY

Patented Aug. 21, 1951

2,565,422

UNITED STATES PATENT OFFICE 2,565,422

SALT FEEDING ATTACHMENT FOR HAY BALERS

Curtis V. Edwards, Yakima, Wash.; Florella L. Edwards executrix of said Curtis V. Edwards, deceased Application July 2, 1946, Serial No. 680,945

4 Claims. (Cl. 99—235)

My invention relates to a device for feeding measured quantities of substances into materials such as hay, straw, plant stocks, leaves, etc. while they are being baled. It relates in particular to a device especially adapted for feeding salt into hay during the process of baling the same. As used in the present disclosure, the term "hay" is intended to include the stocks and leaves of those plants or grasses employed for the feeding of live stock.

The scope and utility of the invention will be understood from the following description of its use as a means for adding salt to hay during the process of baling the same. It has been found that the need of live stock for salt may be satisfactorily supplied by adding salt to the food, and it has been found that the addition of salt to hay renders the hay more palatable, especially the poorer grades of hay. In addition to this, the addition of salt to hay minimizes the tendency for the same to become moldy and therefore unpalatable to the live stock.

It is an object of the invention, therefore, to provide a method and apparatus whereby measured quantities of salt may be added to food substance of the character herein described during the process of baling the same.

An object of the invention is to provide a device operating automatically as the baling of hay proceeds to add measured doses of a dietary substance to the hay so that the hay will carry to the live stock these additional substances of dietary value.

A further object of the invention is to provide a device which receives a dietary substance in crude form, prepares the same for adding to the material being baled, and adds the prepared substance in measured quantity to the material being baled.

A further object of the invention is to provide a device for adding salt to materials being baled which receives the salt in crude form, that is to say, in the form of chunks or crystals, grinds the salt to fine condition and adds measured quantities thereof to the materials as they are baled. In this respect the invention overcomes the difficulties which have been encountered in the use of finely ground salt. Salt in natural crystal form will not cake or solidify under ordinary conditions of storage, but salt which has been ground to suitable fineness for the intended purpose and then sacked often takes on sufficient moisture to cause the same to cake or solidify so that it cannot be added to hay in powdered form. For this reason many storekeepers in the hay-producing districts do not keep sacked, solidified salt in stock, the result being that salt desired for addition to hay is not readily obtainable, and such salt as may be left over from one season to another cakes or solidifies so that it cannot be used the next season. My invention uses salt of a form in which it may be stored for long periods of time, that is to say, from one year to the next without any appreciable caking thereof. This salt, in normal crystal form, is ground in the attachment of my invention as needed and therefore is readily distributed throughout the portions of the hay being baled. In addition to this, the salt is obtainable in its most economical form and is converted to usable form within the short space of time occurring before the addition of the salt to the hay or other material being baled.

A further object of the invention is to provide a device of the character set forth wherein the quantity of materials accumulated in the bales controls the addition of the substance of dietary value.

A further object of the invention is to provide a device of the character herein described wherein a stream or blast of air blows a quantity of finely divided substance of dietary value into the hay or other material in the baler.

Referring to the drawings, which are for illustrative purposes only:

Figure 1:
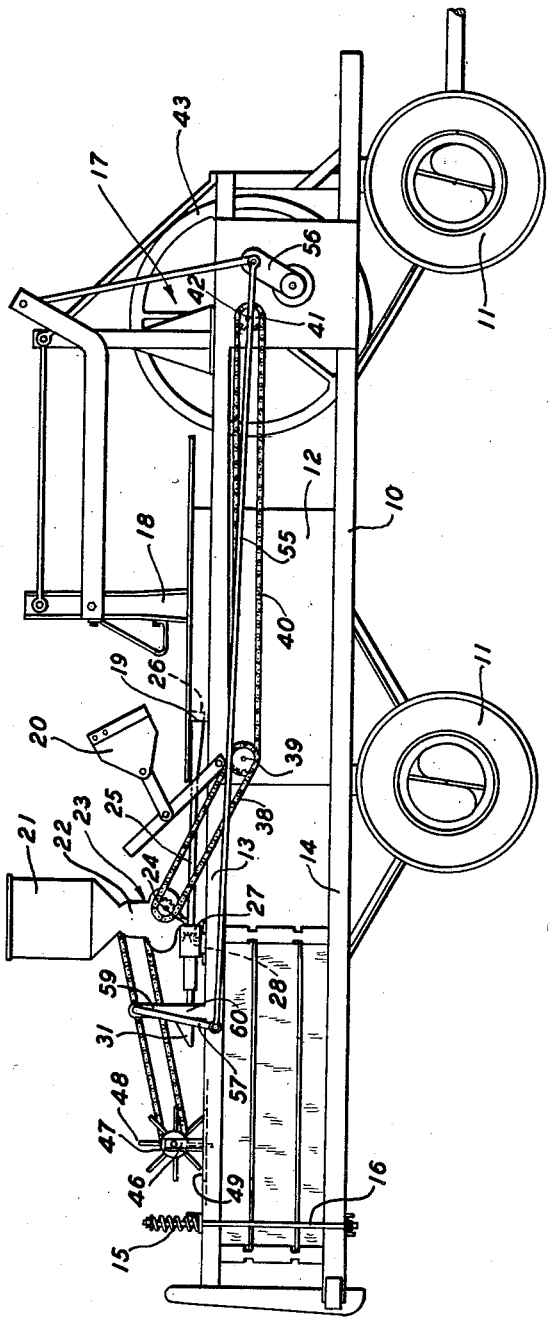
Figure 1 is an elevational view to reduced scale showing a baler with a preferred embodiment of my invention attached thereto.
Figure 2:
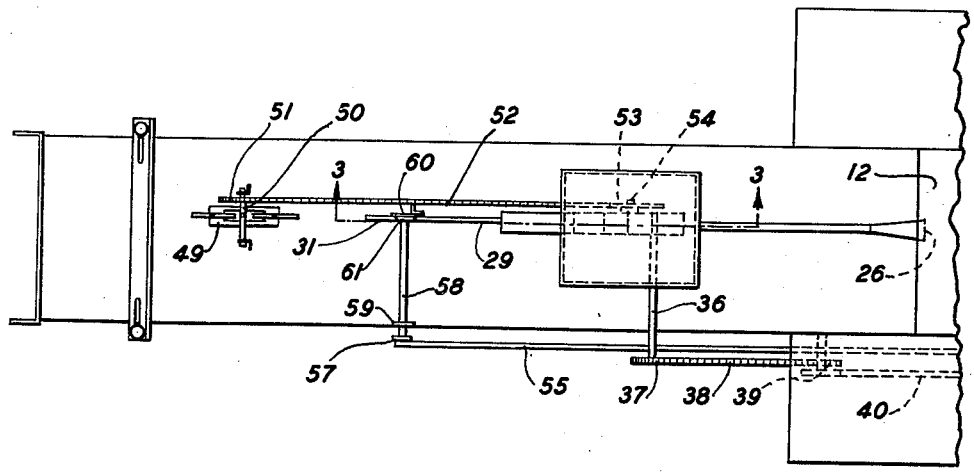
Figure 2 is a plan view to enlarged scale showing the leftward portion of the baler with the device thereon.

For the purpose of showing the environment in which my invention operates, I have in Figure 1 shown schematically a simple form of hay baler having a frame 10 supported on wheels 11, this frame 10 carrying the baler body 12 and the upper and lower extensions 13 and 14 between which the bales are pushed as they are formed, there being spring means 15 acting through tension rods 16 to apply a bale-restraining force to the extensions 13 and 14.

The baler, in keeping with general baler construction, has within the body 12 thereof a plunger, not shown, adapted to be reciprocated by the power-driven mechanism 17 of the baler, and also a hay feeder 18 arranged for vertical reciprocation with relation to the baling chamber 19 of the baler. The baler is also shown as having a divider block holder 20.

The feeding attachment includes a hopper 21 which is supported on the upper extension 13 adjacent the holder 20. This hopper 21 has at its lower end a feeder for delivering measured quantities of material from the hopper 21 to a grinder 23, the discharge spout 24 of which communicates with a duct 25.

Figure 3:
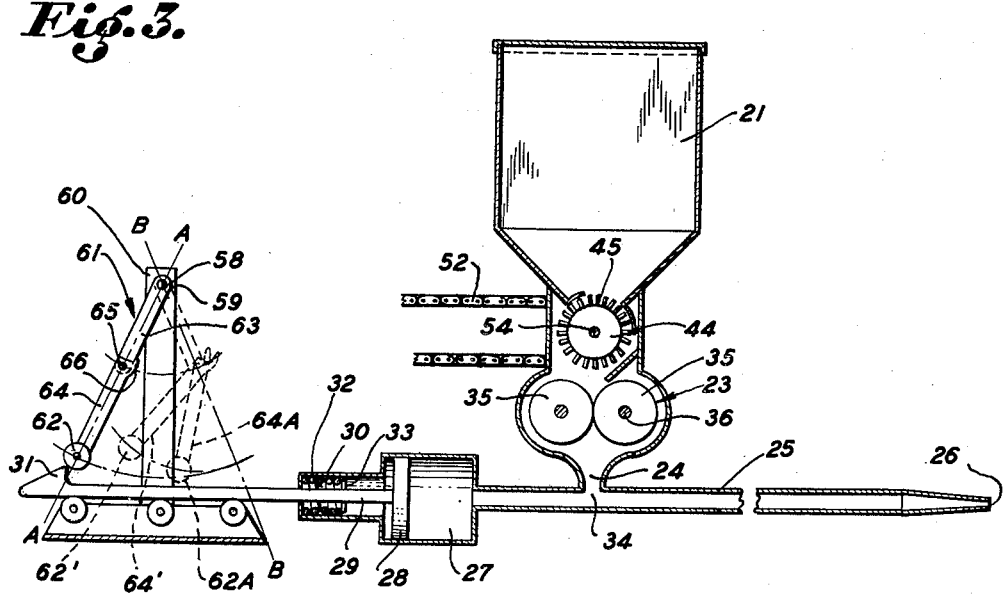
Figure 3 is an enlarged partly sectioned schematic view showing the driven parts of the mechanism.

This duct 25 consists of a tube placed so that its rightward end or mouth 26 communicates with the baling chamber 19. The leftward or inlet end of the duct 25 is connected with a cylinder 27. In this cylinder 27 a plunger 28 is disposed, having a leftwardly extending stem 29 which projects through a tubular extension 30 and has on its leftward end a hook 31. A spring 32 acts in compression against a collar 33 which is fixed on the stem 29, this spring 32 tending to force the plunger or piston 28 rightwardly in the cylinder 27, making it possible to retract the plunger 28, against the force of the spring 32, into the position in which it is shown in Figure 3, and to then release the plunger so that the spring 32 will snap it rightwardly and drive a blast of air through the duct or nozzle 25. This blast of air will carry rightwardly from the space 34 in the duct 25 the pulverized or ground materials which have dropped through the outlet 24 from the grinder 23, and this blast of air will carry the substances from the space 34 into the baling chamber 19 and will disburse the substances into the material in the baling chamber 19.

The grinder 23 has grinding rolls 35 and these rolls are rotated by a chain drive from the power mechanism 17 of the baler. For this purpose I extend from one of the rolls 35 of the grinder 23 a shaft 36 and on the extended end of this shaft 36 fix a sprocket 37 which is connected by a chain 38 with a dual sprocket 39 mounted on the side of the baler. From the dual sprocket 39 a chain 40 is carried over a drive sprocket 41 mounted on a continuously rotating shaft 42 which may be rotated by, or may be an extension of, the shaft of the mechanism on which the flywheel 43 of the mechanism 17 is carried. By this arrangement the rolls 35 of the grinder 23 are kept in continuous rotation and grind the materials which are delivered thereto from the hopper 21 by the feeder 22.

The feeder 22 comprises a wheel 44 having pockets 45 which carry the substance which is to be fed, for example, salt, to the grinder 23. The measurement of the doses or quantities delivered by the feeder 22 is determined by the rate of rotation of the wheel 44. It is a feature of the invention to actuate the wheel 44 of the feeder 22 by actual movement of hay within the baler. Specifically, the rotation of the wheel 44 is accomplished by movement of baled hay leftwardly through the space between the extensions 13 and 14. To accomplish this result, I mount on the upper extension 13, by means of a bracket 46, a wheel 47 having radially projecting spikes 48 of such length that as the wheel 47 is rotated the spikes 48 will project through an opening 49 in the upper extension 13 and engage the upper portion of the underlying bale, whereby leftward movement of the bale thus engaged will produce clockwise rotation of the wheel 47 at a rate determined by the movement of the bale, which bale-movement is determined by the rate or quantity of hay placement in the baling chamber 19. The wheel 47 is fixed on a shaft 50 which is connected by a sprocket 51, a chain 52, and a sprocket 53 with a shaft 54 which projects from the feeder wheel 44. By changing either one or the other of the sprockets 51 or 53, the feeding rate of the feeder 22 may be changed.

The plunger 28 is periodically reciprocated during the operation of the baler so that it will force consecutive air blasts through the duct 25, through use of a link 55 which has its rightward end pivotally connected to the crank 56 of the baler mechanism through which the feeder is reciprocated. The leftward end of the link 55 is pivotally connected to the lower end of a lever 57 which is fixed on, and depends from, the near end of a horizontal shaft 58 supported by brackets 59 and 60. As best shown in Figure 3, a hinged lever 61 is fixed on the shaft 58 in such position that a roller 62 at its lower end will engage the hook 31. The hinged lever 61 consists of a lever proper 63 and an arm 64 hinged to its lower end by a pivot member 65, this arm 64 having the roller 62 on its lower end. So that the arm 64 will not swing in counterclockwise direction on the lever 63 beyond the straightened position in which it is shown in full lines in Figure 3, the arm 64 is provided with a stop 66 adapted to engage the lever 63. Rotation of the crank 56 transmits through the link 55 to the lever 63 a swinging motion between the extreme positions indicated by the broken lines A—A and B—B. As the link 55 is moved leftward from the position in which it is shown in Figure 1, it will swing the lever 63 through the position in which it is shown in full lines in Figure 3, and the roller 62 will be carried leftward, and acting against the hook 31 this roller 62 will pull the plunger 28 leftward into the position in which it is shown in full lines in Figure 3, and as the lever 63 continues its leftward movement toward the position indicated by the line A—A, roller 62 will snap over the point of the hook 31, releasing the hook 31 so that the spring 32 will impel the plunger 28 rapidly in rightward direction to expel the air contained in the cylinder 27, thereby producing a blast of air through the duct 25 which will carry into the baler chamber powdered substances occupying the space 34 at the lower end of the grinder outlet 24.

As the action of the crank 56 then swings the lever 63 from the position indicated by the line A—A to the position indicated by the line B—B, the arm 64 will swing relatively to the lever 63, as indicated at 64', and the roller will ride over the point of the hook 31, as indicated at 62'. When the roller 62 passes over the point of the hook 31, the arm 64 drops by gravity into the position 64a thereof, wherein the roller, as shown at 62a, will be again positioned in from the hook 31 so that upon leftward swinging of the lever 63 the roller 62 will engage the hook 31 and retract the plunger 28 for another operation thereof.

Salt, obtainable in crystal form, and other materials desired to be fed to the fibrous material being baled, may be placed in the hopper 21 and by the use of the mechanism hereinbefore described may be distributed through the fibrous materials which are placed in the baling chamber, and the feed substances will be incorporated in the bales as they are formed.

I claim:

1. In an attachment for feeding salt to hay in hay baler having a baling chamber to receive hay, bale receiving means communicating with said chamber and hay compressing mechanism with reciprocating means acting on the hay to form it into bales, the combination of: a hopper for salt; measuring means controlling issue of salt from said hopper, said measuring means having an actuating portion comprising a wheel adapted to engage and be moved by a bale moving in the baler so that the issue of salt from said hopper will be proportionate to the quantities of hay baled; a grinder receiving the salt issued from said hopper; and means for injecting the ground salt from said grinder into hay in said baling chamber comprising an expansile-contractile air chamber, resilient means disposed to suddenly contract said air chamber and produce air blasts, a linkage through which said compressing mechanism acts in timed relation to said reciprocating means to expand said air chamber and release the same for contraction by said resilient means, and means forming a duct from said air chamber to carry said air blasts and said salt to said baling chamber.

2. In an attachment for feeding salt to hay in hay baler having a baling chamber to receive hay, bale receiving means communicating with said chamber and hay compressing mechanism with reciprocating means acting on the hay to form it into bales, the combination of: a hopper for salt; measuring means controlling issue of salt from said hopper, said measuring means having an actuating portion comprising a wheel adapted to engage and be moved by a bale moving in the baler so that the issue of salt from said hopper will be proportionate to the quantities of hay baled; and means for injecting the salt issued from said hopper into hay in said baling chamber comprising an expansile-contractile air chamber, resilient means disposed to suddenly contract said air chamber and produce air blasts, a linkage through which said compressing mechanism acts in timed relation to said reciprocating means to expand said air chamber and release the same for contraction by said resilient means, and means forming a duct from said air chamber to carry said air blasts and said salt to said baling chamber.

3. In an attachment for feeding salt to hay in hay baler having a baling chamber to receive hay, bale receiving means communicating with said chamber and hay compressing mechanism with reciprocating means acting on the hay to form it into bales, the combination of: a hopper for salt; measuring means controlling issue of salt from said hopper; a grinder receiving the salt issued from said hopper; and means for injecting the ground salt from said grinder into hay in said baling chamber comprising an expansile-contractile air chamber, resilient means disposed to suddenly contract said air chamber and produce air blasts, a linkage through which said compressing mechanism acts in timed relation to said reciprocating means to expand said air chamber and release the same for contraction by said resilient means, and means forming a duct from said air chamber to carry said air blasts and said salt to said baling chamber.

4. In an attachment for feeding salt to hay in hay baler having a baling chamber to receive hay, bale receiving means communicating with said chamber and hay compressing mechanism with reciprocating means acting on the hay to form it into bales, the combination of: a hopper for salt; measuring means controlling issue of salt from said hopper; and means for injecting the salt issued from said hopper into hay in said baling chamber comprising an expansile-contractile air chamber, resilient means disposed to suddenly contract said air chamber and produce air blasts, a linkage through which said compressing mechanism acts in timed relation to said reciprocating means to expand said air chamber and release the same for contraction by said resilient means, and means forming a duct from said air chamber to carry said air blasts and said salt to said baling chamber.

CURTIS V. EDWARDS.

REFERENCES CITED

The following references are of record in the file of this patent:

UNITED STATES PATENTS

| Number | Name | Date |
|---|---|---|
| 411,692 | Strawson | Sept. 24, 1889 |
| 506,892 | Wiebe | Oct. 17, 1893 |
| 604,559 | Cottle | May 24, 1898 |
| 1,013,568 | Sharpe | Jan. 2, 1912 |
| 1,228,640 | Belton | June 5, 1917 |
| 1,454,558 | Paton | May 8, 1923 |
| 1,890,164 | Rosenberger | Dec. 6, 1932 |
| 1,953,091 | Westberg et al. | Apr. 3, 1934 |
| 1,994,343 | Graves | Mar. 12, 1935 |
| 2,038,008 | Shodron | Apr. 21, 1936 |
| 2,328,581 | Quinn | Sept. 7, 1943 |